United States Patent [19]

Barth

[11] Patent Number: 5,269,497

[45] Date of Patent: Dec. 14, 1993

[54] SEAT SPRING STRUCTURE

[75] Inventor: Melvin J. Barth, Durango, Iowa

[73] Assignee: Flexsteel Industries, Inc., Dubuque, Iowa

[21] Appl. No.: 628,467

[22] Filed: Dec. 17, 1990

[51] Int. Cl.$^5$ .............................................. F16F 3/00
[52] U.S. Cl. ..................................... 267/110; 267/160
[58] Field of Search ............... 267/110, 111, 158, 160, 267/164; 5/246, 247, 255; 297/452

[56] References Cited

U.S. PATENT DOCUMENTS

| | | | |
|---|---|---|---|
| 2,316,628 | 4/1943 | Schaffner | 5/247 X |
| 2,975,258 | 3/1961 | Higginbottom | 267/160 X |
| 3,276,765 | 10/1966 | Slominski et al. | 267/111 |
| 4,567,615 | 2/1986 | Fanti | 267/160 X |
| 4,815,717 | 3/1989 | Crosby | 267/110 |
| 4,854,643 | 8/1989 | Cojacari et al. | 267/110 X |
| 4,865,250 | 9/1989 | Zaveri et al. | 267/158 X |
| 4,874,051 | 10/1989 | Borchard | 267/164 X |
| 5,022,709 | 6/1991 | Marchino | 297/452 |

Primary Examiner—Robert J. Oberleitner
Assistant Examiner—Peter M. Poon
Attorney, Agent, or Firm—James C. Nemmers

[57] ABSTRACT

A seat spring unit for use in the seats of vehicles, chairs, sofas and the like. The unit utilizes flat spring steel members arranged in a generally parallel arrangement from the front to rear frame members of the seat. Each of the spring steel members is formed with one of more downwardly extending vee-arches near the front and/or rear frame member to provide flexibility, comfort and support for the seat cushions while greatly simplifying the structure of the unit. Additionally, the center portion of each spring member has an upwardly crowned area between the vee-arches to better control the load deflection.

6 Claims, 1 Drawing Sheet

SEAT SPRING STRUCTURE

BACKGROUND OF THE INVENTION

There are known and presently used numerous spring structures for the seats of vehicles and furniture. Most of these spring structures are somewhat complex arrangements thought to be necessary in order to provide the desired comfort and support. Examples of such spring structures are shown in Santillo, U.S. Pat. No. 3,156,460 and Crahan, U.S. Pat. No. 2,788,844. Although these spring structures do provide both support and comfort, they obviously require a number of components and are relatively costly to manufacture. These spring structures were designed to provide better comfort and support than could be provided by the more simple spring structures such as those illustrated in Deutsch, U.S. Pat. No. 2,375,286, Beachley, U.S. Pat. No. 2,358,437, Schaffner, U.S. Pat. No. 2,335,160, and Schaffner, U.S. Pat. No. 2,316,628.

Also, there are known and used spring structures that utilize simple coil and zigzag springs, but with these structures, comfort and durability are sacrificed.

Additional examples of structures that attempt to provide improved comfort and proper support are illustrated in Platt, U.S. Pat. No. 2,935,124 and Crites, U.S. Pat. No. 2,817,390.

All of the foregoing prior art patents attempt to provide at the lowest possible cost a spring structure that is sufficiently soft to be comfortable, but sufficiently stiff to provide proper support and prevent sag. There is therefore a need for an improved spring structure which can provide the soft and comfortable feel with proper support and without undesirable sag at a lower cost than the prior art structures.

SUMMARY OF THE INVENTION

The seat spring structure of the invention utilizes spaced apart spring steel straps extending from front to rear of a frame with each strap containing at least one vee-arch. The use of the vee-arch near the rear frame, or near both the rear and front frames, allows increased vertical deflection of the spring and therefore provides a softer feel. Because the area of the spring strap between the frames is crowned, the forces transferred to the frames are reduced while the load carrying capacity of the spring unit itself is increased.

DESCRIPTION OF THE PREFERRED EMBODIMENTS OF THE INVENTION

Figure 1:
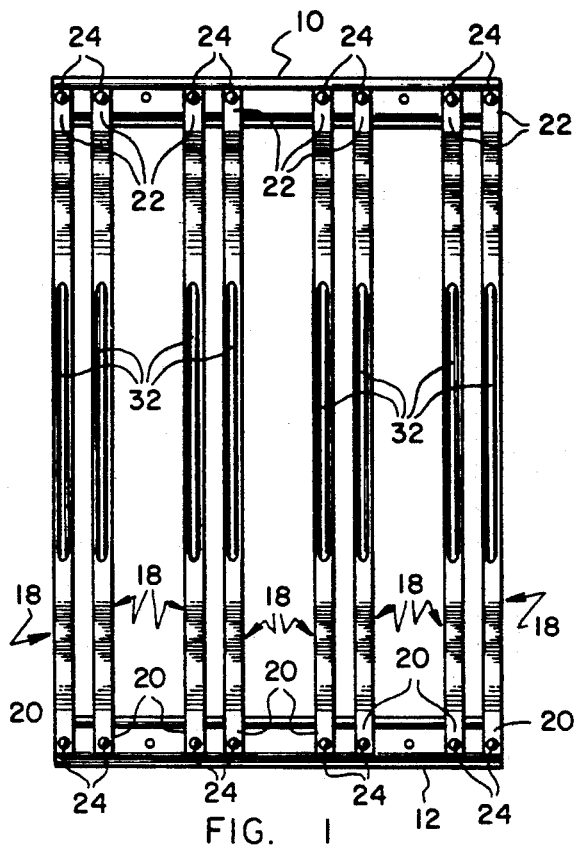
FIG. 1 is a top or plan view of a typical spring unit constructed according to the principles of the invention.

There is illustrated in the drawings a spring unit that has a front frame member 10 and a rear frame member 12 that may be joined to two side members 14 and 16 (see FIG. 3) to form a rigid frame. The spring unit shown in FIGS. 1 and 2 does not employ side members 14 and 16, this being a matter of design. The frame members 10, 12, 14 and 16 are formed from conventional structural shapes as illustrated in the drawings. The spacing and arrangement of the front and rear frame members 10 and 12, and the side members 14 and 16, are dependent upon the dimensions of the structure in which the spring unit is to be used. As best seen in FIG. 1, the frame members 10 and 12 support individual springs each indicated generally by the reference numeral 18. Each of the springs 18 has one end connected to the front frame member 10 and the other end connected to the rear frame member 12. Springs 18 are shown as being positioned in parallel spaced apart relationship, with the spacing and positioning of the springs 18 dependent upon the overall design objectives taking into account the size and shape of the spring unit, the material, such as foam, that will be placed over the spring unit, and the desired sitting feel. In the drawings, there is illustrated a unit in which pairs of springs 18 are parallel and are positioned with the spacing between each pair greater than the spacing between the individual springs 18 that form a pair. This produces a unit with increased support and a slightly stiffer feel than if individual springs 18 were equally spaced between the side members 14 and 16. In some designs, the individual springs 18 may be in parallel pairs with the pairs not all being parallel to each other, while in other designs, such as that shown in FIG. 3, none of the individual springs 18 are parallel. The specific arrangement of the springs 18 is therefore chosen by the designer to achieve particular design objectives.

As illustrated in the drawings, each spring 18 is of a flat spring steel of the desired thickness and width. For example, 1064 spring steel is a suitable material because of its ability to be formed into the desired shape described hereinafter. Also, each spring 18 is preferably 0.060 inches thick by 0.600 inches wide for most applications. It has been found that with this material and these dimensions, the springs 18 will retain their shape after repeated deflections.

Figure 2:
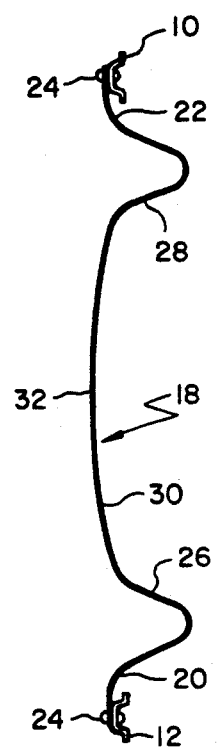
FIG. 2 is a side elevational view of the spring unit of FIG. 1 and shows the configuration of the individual springs that form the unit.
Figure 3:
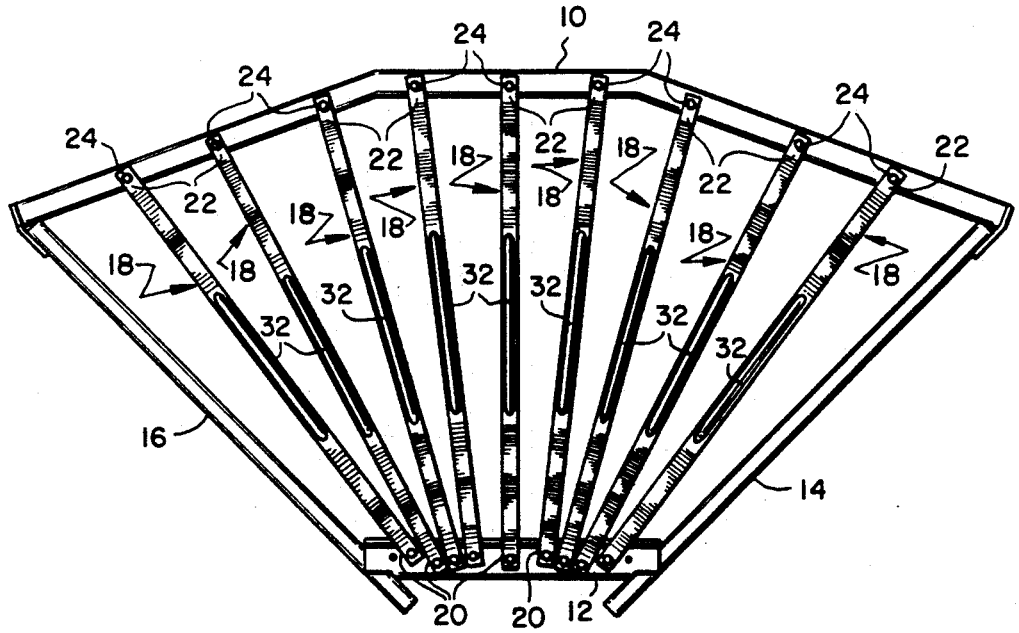
FIG. 3 is a top or plan view of another spring unit of the invention and showing a different spring arrangement.

Each of the springs 18 has a rear end portion 20 that is affixed to the rear frame member 12 and a front end portion 22 that is affixed to the front frame member 10. Attachment of the springs 18 can be done in any suitable manner, such as by the use of rivets 24. Formed near the rear end portion 20 is a first vee-arch 26 as best seen in FIG. 2. Similarly, formed near the front end portion 22 is a vee-arch 28. Between the vee-arch 26 and 28 is a central portion 30 that is formed with a crown and may be provided with a strengthening portion 32 formed from the same material that is used in forming the springs 18. The strengthening portion 32 assists in spreading the load in each spring member 18 over the length of the member 18. Also, the strengthening portion 32 when combined with the crown of the central portion 30 provides some additional resistance to vertical movement without limiting the downward travel of the spring member 18. This design of the central portion 30 thus helps to increase the range of vertical deflection of each spring member 18, thus providing support without loss of the desired sitting feel.

As best seen in FIG. 2, the vee-arches 26 and 28 are positioned out of the sitting area which is defined primarily by the central portions 30 of the springs 18. Each of the vee-arches 26 and 28 are provided with a radius or curve at the lower end so as to facilitate formation of the vee-arches 26 and 28. The depth of each vee-arch 26 and 28 depends upon the desired spring rate and sitting feel. The greater the depth of each vee-arch 26 and 28, the softer the feel.

Although there is illustrated in the preferred embodiments a vee-arch 26 at the rear and a vee-arch 28 at the front of each spring 18, some designs may require only a single vee-arch. If a single vee-arch is used, it may be located either near the front end portion 22 or rear end portion 20. The purpose of the vee-arch is to provide for increased up and down travel of the spring 18 while also increasing the load carrying capacity of the spring unit. Using two vee-arches, one near each end of the spring 18, allows for more vertical travel of the spring 18 and thus a softer feel than if only one vee-arch is used. Additional spring travel also keeps the spring 18 from fully straightening out, which reduces the load transferred to the front and rear frame members 10 and 12. The frame members 10 and 12, and if used the side members 14 and 16, can therefore be designed using a more efficient and less costly cross-sectional area.

Although the preferred embodiments show the rear frame member 12 and the front frame member 10 at the same level, the rear frame member 12 may be at a height slightly above or below the front frame member 10. This also is a matter of design choice.

From the foregoing description, it will be evident that the design of the springs 18 using one or more vee-arches with a central crown provides a very simple construction for a spring unit. The springs 18 are also relatively simple to manufacture and the spring unit is relatively simple to assemble. The simplicity of the design of the springs 18 also gives the designer maximum flexibility in providing the overall effect which the designer wishes to achieve. By varying any one of the variables, such as the number of vee-arches, the amount of the crown of the central portion 30, the length of the springs 18, and the number, arrangement and spacing of the springs 18, the designer is in a position to easily produce a spring unit for a number of different applications, depending upon the sitting feel desired when used in combination with a variety of different coverings over the spring unit. Thus, the basic principles of the invention allow standardized components to be used in designing spring units for a variety of different types of applications for both furniture and for seats in vehicles and other applications.

Having thus described the invention in connection with a preferred embodiment thereof, it will be evident to those skilled in the art that various revisions and modifications can be made to the preferred embodiment described herein without departing from the spirit and scope of the invention. It is my intention, however, that all such revisions and modifications as are obvious to those skilled in the art will be included within the scope of the following claims.

What is claimed is as follows:

1. A seat spring structure comprising spaced apart front and rear transverse frame members, a plurality of spaced-apart spring members extending between the front and rear frame members, each spring member having a central portion and front and rear ends, fastening means fixedly connecting the front end of each spring member to the front frame member and the rear end of each spring member to the rear frame member, said fastening means providing for flexing non-pivotal movement of each spring member relative to the frame members, each spring member being formed of a single strip of solid flat spring steel with the central portion crowned, and a downwardly extending vee-arch formed in each spring member between the central portion and one of its ends, the vee-arch of each spring member being formed with a radius at the bottom of the vee so as to provide for vertical travel of the spring while preventing the spring member from substantially flattening out.

2. The seat spring structure of claim 1 in which the width of each solid flat spring member is substantially greater than its thickness and the central portion of each spring member is formed with a strengthening portion that provides additional resistance to vertical movement of the spring member.

3. The seat spring structure of claim 2 in which there is a vee-arch joined to the center portion near both the front end and the rear end of each spring.

4. The seat spring structure of claim 3 in which the spring members are parallel to each other.

5. The seat spring structure of claim 4 in which the spring members are equally spaced apart.

6. The seat spring structure of claim 5 in which the spring members are arranged in pairs, each pair being equally spaced from the other pairs.

* * * * *